Aug. 18, 1953   H. P. DUPRE   2,649,076
POWER-OPERATED TOOL WITH AUTOMATIC CONTROL VALVE SYSTEM
Filed June 20, 1950
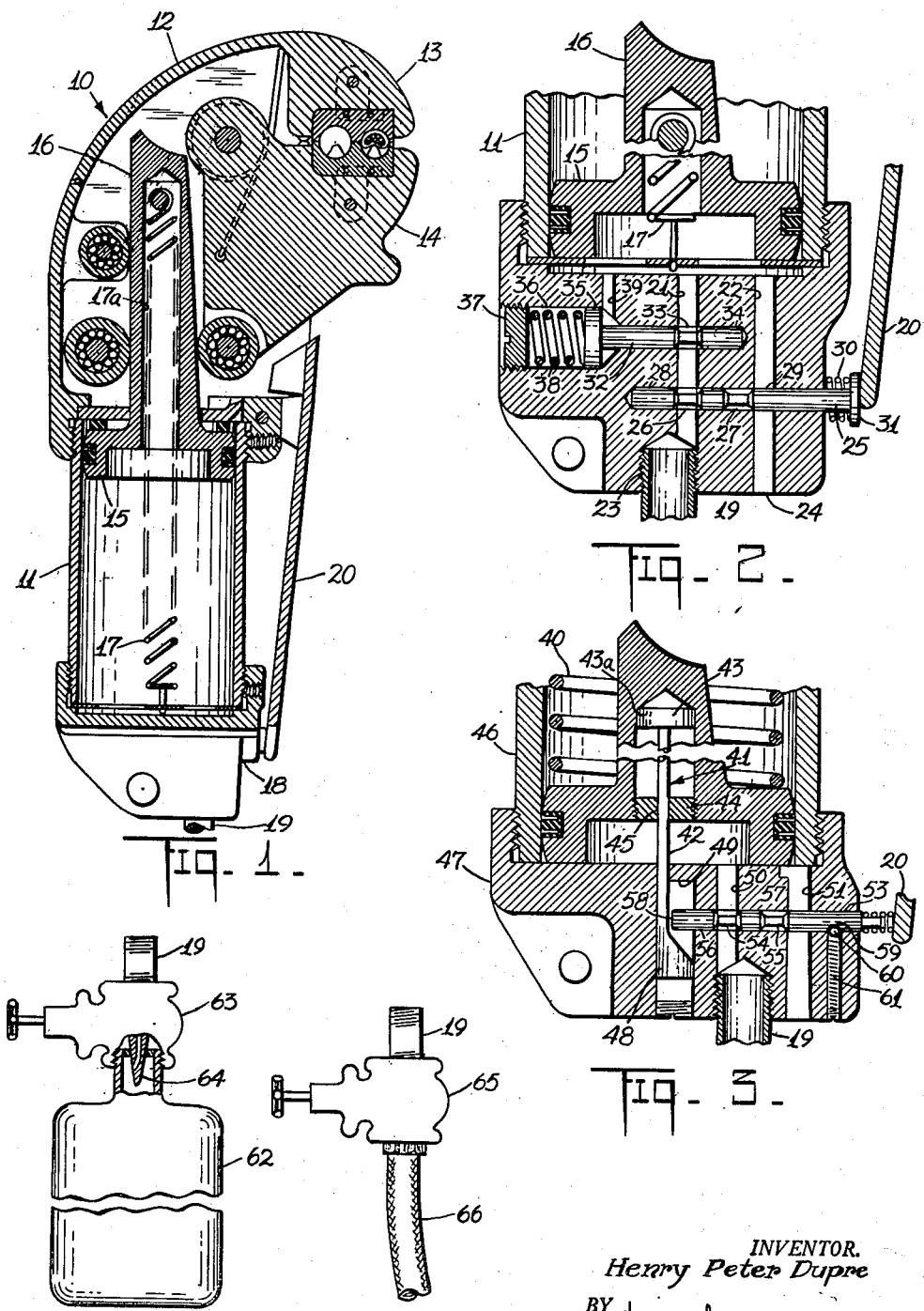
INVENTOR.
Henry Peter Dupre
BY
Harry Ernest Rubens
ATTORNEY Patented Aug. 18, 1953

2,649,076

UNITED STATES PATENT OFFICE 2,649,076

POWER-OPERATED TOOL WITH AUTOMATIC CONTROL VALVE SYSTEM

Henry Peter Dupre, Croton-on-Hudson, N. Y., assignor to Burndy Engineering Company, Inc., a corporation of New York Application June 20, 1950, Serial No. 169,178

5 Claims. (Cl. 121—38)

1

My invention relates to a power operated tool and more particularly to a compression tool or the like that is operated by fluid pressure with an automatic valve control system for blocking and venting the fluid pressure to the tool at the end of the power stroke. This application is a continuation-in-part of my application, Serial No. 97,635, filed June 7, 1949, and now Patent No. 2,600,860, granted June 17, 1952.

In my prior application I disclosed a compression tool in which the jaws are actuated by a fluid operated piston. The operation of the piston is controlled by a manually operated valve which when compressed by the operator admits pressure to the piston and when released by the operator exhausts the pressure acting on the piston.

I have found that I can materially reduce the time to complete an installation and also conserve the power supply, by providing an automatically controlled valve system.

Accordingly it is therefore a primary object of my invention to provide in a fluid power operated tool, a control system for automatically blocking the flow of fluid to the tool at the completion of the power stroke, and thereafter exhausting the fluid from the tool by automatic or manual means.

It is a further object to provide in such a tool a control valve system which is actuated by fluid pressure.

It is still another object of my invention to provide a control valve system that is mechanically actuated when the piston has completed its power stroke.

Where a fixed source of power is not available, such as in a field installation, it has been the custom to use a mechanically operated tool, or to provide a portable air compressor or hydraulic pump unit for use with a power operated tool. These units were at times cumbersome to handle, inconvenient to move from one installation to another and sometimes slow in operation. It is therefore another important object of my invention to provide with a compression tool a self contained portable fluid power source which will provide sufficient power for a plurality of rapid and repetitive work cycles and which power source when exhausted can be readily replaced by another for continued operation of the tool.

Still another object is to provide in a tool having a portable self contained power source, a valve system that will cut off the source of pressure to the tool at the minimum designed

2 operating pressure necessary for any given type of installation regardless of the excess pressure available, thus conserving the power supply and insuring a maximum number of work cycles from the power available.

Other objects of my invention are to provide a power source that is light in weight and small in size to permit it to be attached to the tool and carried therewith; to provide a control valve system that can be adjusted to operate at various pressures and positions of the piston; to provide a main control valve for the valve system that may be attached to the power source or the tool; and to provide a tool having a control valve system that can be utilized with a fixed or self contained portable power source.

I accomplish these and other objects and obtain my new results as will be apparent from the device described in the following specification, particularly pointed out in the claims, and illustrated in the accompanying drawing, in which—

Fig. 1 is a side elevation view in section of one type of a fluid operated tool that may be utilized with my invention, Fig. 2 a partial side elevation view in section of the cylinder showing my novel valve system in a position to admit pressure to the cylinder, Fig. 3 is a partial side elevation view in section of a modified piston and valve unit arrangement in the same position, Fig. 4 a side elevation view of a main control valve attached to a self contained bottled power source, and Fig. 5 a side elevation view of a main control valve attached to a power source by a flexible line.

In the drawing reference numeral 10 designates one type of a fluid operated device, such as a tool upon which my present invention may be utilized. As more fully described in my above mentioned co-pending application, the tool 10 comprises generally a cylinder 11 constituting a handle portion, having at one end a fixed jaw body 12 with fixed jaw 13, and movable jaw 14 pivotally mounted within the jaw body 12. The movable jaw 14 is actuated by piston and extension 15 and 16 respectively, reciprocating in the cylinder 11. The piston and extension are biased to a retracted position by return spring 17. Mounted to the other end of the cylinder 11 is a valve unit 18 having a power supply connection 19. The pressure is admitted to the cylinder through the valve unit 18 by actuating the trigger 20 which is pivotally mounted to the tool. As shown in Fig. 1 the piston and extension 15 and 16 are in a pressure actuated position, and the jaws are closed to compress the work piece therebetween.

In Fig. 2 I have illustrated in detail the valve unit 18 constructed in accordance with my present invention which unit may be integrally formed with the cylinder 11 as illustrated, or made into a separate part and threadedly secured to the cylinder.

Intake port 21 and exhaust port 22 extend longitudinally of the tool from the cylinder 11; the intake port 21 leading to a tapped aperture 23 which threadedly receives the supply connection 19, while the exhaust port 22 leads to the atmosphere at 24. A manual control valve piston 25 extends transversely into the valve unit to intersect each of the ports and has undercut portions 26 and 27 for alternate alignment with the intake and exhaust ports 21 and 22, respectively. Adjacent land portions 28 and 29 on the valve piston alternately block their respective ports. One end of the control valve piston 25 extends outside of the valve unit and is abutted by the free end of the trigger 20 which functions to force the control valve piston 25 to an inward position, as illustrated, to permit charging the cylinder and the start of the power operation. The control valve piston 25 is spring biased to an outward position by a compression spring 30 mounted between the outer wall of the valve unit and a shoulder 31 on the valve, and the piston 25 in this position permits the pressure in the cylinder to be exhausted.

An automatic cut-off valve piston 32 is mounted transversely within the valve unit 18 between the cylinder 11 and the manual control valve piston 25. The cut-off valve 32 intersects the intake port 21 and has an undercut portion 33 for alignment with the intake port 21, and a land section 34 to block the intake port when the piston is actuated. A head portion 35 of the cut-off valve piston 32 is positioned in an enlarged drilled chamber 36 in the valve unit and is secured therein by an adjusting screw 37. A return spring 38 is positioned between the adjusting screw 37 and one side of the head 35 to bias the blocking valve piston to a pressure admitting position, where the undercut portion 33 is aligned with intake port 21 as shown in Fig. 2. An unrestricted return port 39 extends from the cylinder 11 to the chamber 36 on the side of the head 35 opposite the spring 38 to admit fluid pressure to move the cut-off valve piston 32 against the spring to a position where the land section 34 blocks the inlet portion 21.

When the tool is not in operation the cut-off valve piston 32 is spring biased in an innermost position in the valve unit with the undercut portion 33 aligned with the intake port 21. The control valve 25 is spring biased to an outermost position in the valve unit with the land 28 blocking the inlet port 21 and the undercut portion 26 aligned with the exhaust port to vent the cylinder, not illustrated.

The cylinder 11 is charged for operation of the tool by the operator compressing the trigger 20 forcing the control valve piston 25 into the valve unit against the pressure of spring 30 and aligning the undercut portion 26 with the inlet port 21, as shown, admitting pressure through the control valve 25 and cut-off valve 32 respectively to the cylinder.

The piston 15 starts upward in a power stroke and the pressure is simultaneously admitted in the chamber 36 through port 39 to oppose the pressure of return spring 38. When the pressure builds up in the cylinder to an amount above the predetermined setting of the spring 38, the cut-off valve piston 36 is forced outwardly against the spring action to a position where the land portion 34 blocks the inlet port 21 and prevents the further admission of pressure to the cylinder. The desired power stroke of the tool being completed, the operator may vent the cylinder 11, retracting the piston 15 and opening the jaws by releasing the trigger. The control valve 25 is forced outwardly of the valve unit by spring 30, aligning the undercut portion 27 with the exhaust port 22 and blocking the inlet port 21 by land portion 28. The venting of the cylinder relieves the fluid pressure in the chamber 36 and the cut-off valve 32 is spring returned inwardly in the valve unit, aligning undercut 33 with the inlet port 21 in a position for the start of the next cycle.

The amount of fluid pressure admitted to the cylinder can be controlled to a value required for a particular installation. Compression tools or the like, as illustrated, are designed to operate on work pieces of varying sizes which require different minimum operating pressures. The adjustment screw 37 is designed to vary the pressure in the cylinder by decreasing or increasing the compression on spring 38 from the minimum value to the maximum pressure required for the various sizes of work pieces that the tool can accommodate. This adjustment feature is very important when a limited source of fluid pressure is available. For example, when a self-contained power source is used with the tool, such as a container of liquid $CO_2$ as illustrated in Fig. 4, it is desirable that the maximum number of complete work cycles be available to the tool for each container.

A substantial savings of the gas and available pressure in the container can be achieved by use of the adjustment screw which can be set so that the automatic cut-off of valve 32 will block the inlet port 21 at the minimum pressure required for a given work job regardless of the excess pressure available at the source.

In Fig. 3 I have shown a modification of my value unit which provides for an automatic cut-off of the pressure source to the tool and a simultaneous return of the tool to its starting position. The tool 10 as shown in Fig. 1 may be utilized by modification of the piston extension 16 and the valve unit 18. The return tension spring 17, as shown in Fig. 1, is replaced by a compression spring 40 which bears against the piston 15 and the plate 25. The drilled aperture 17a of piston extension 16 is utilized to receive a reciprocating valve actuating assembly 41 comprising a rod 42 having at one end a cylindrical button 43 threadedly mounted or otherwise attached thereto and freely slidable within the aperture 17a. A drilled aperture 43a may be provided in the button 43 to equalize any pressure that may be present in the drilled aperture 17a. A plug 44 having an aperture 45 through which the rod 42 freely extends is threadedly mounted in the drilled aperture 17a at the base of the piston extension 16. The other end of rod 42 extends through the cylinder 46 into the valve unit 47 and is provided with a wedge shaped portion 48 which is freely slidable in a drilled chamber 49 in the valve unit. Intake port 50 and exhaust port 51 are provided in the valve unit 47 similar to ports 21 and 22 in Fig. 2. A control valve 53, similar to control valve 25 in Fig. 2, is provided to intersect both the intake and exhaust port 50 and 51 respectively, and contains undercut portions 54 and 55 for alternative alignment with the intake and exhaust ports 51 and 52 respectively, with land portions 56 and 57 for blocking the respective ports. The innermost end 58 of the control valve 53 enters into the chamber 49 and lies in the path of the wedge 48 to be actuated thereby in a manner to be described. The control valve 53 is provided with a recess 59 to receive a spring loaded detent 60 to insure that the control valve 53 is retained in a depressed position admitting pressure to the cylinder 46 until the end of the power stroke even though the trigger 20 is prematurely released by the operator. A spring 61 is positioned between the outermost end of the control valve 53 and the free end of the trigger 20 to prevent shock to the operator when the control valve is mechanically moved out of the valve unit at the end of the power stroke.

In the non-operating position of the device shown in Fig. 3 the piston 15 and extension 16 is fully retracted by the return compression spring 40. The button 43 abuts the end of aperture 17a in the piston extension 16 fully depressing the rod and positioning the wedge 48 clear of the end 58 of the control valve 53. The control valve is in an outermost position venting the cylinder 46 around undercut 55 and blocking the intake port 50 by land 56. To initiate a power stroke, the trigger 20 is depressed by the hand of the operator moving the control valve into the valve unit, as shown, to align undercut portion 54 with the intake port 50 and charge the cylinder. The control valve is maintained in the charging position by the recess and detent 59 and 60 respectively, insuring the completion of the power stroke even though the trigger is released by the operator. When the piston extension 16 approaches the end of its power stroke, the button 43 is abutted by the plug 44 carrying the rod 42 upwardly and camming the control valve 53 by wedge 48 outwardly of the valve unit disengaging the detent 60 from the recess 59 to block the intake port and simultaneously exhaust the cylinder. The piston and extension 16 is spring returned to its retracted position, and the valve system is in a position for the initiation of a new cycle.

Fig. 4 illustrates one type of a self-contained fluid pressure source which may be utilized, comprising a cylinder or bottle 62 preferably liquid carbon dioxide, which utilizes as a source of pressure the carbon dioxide gas which boils off from the liquid. A main control valve 63, which may be of a globe type, is threadedly mounted to the bottle 62 and has a threaded supply connection 19 mounted to the other side for threaded attachment to the valve unit 18 or 47. The supply connection 19 may be of a rigid construction for assembly of the bottle to the tool as a unit or may be long and flexible for movement of the tool independent of the bottle source. The main control valve 63 may be provided with a piercing element 64 to provide an opening in the sealed bottle simultaneously when attached.

The control valve 63 is positioned between the power source and the tool and is normally closed to prevent accidental operation of the tool when not in use and avoid any dissipation of the power source due to leakage.

The valve systems illustrated in Figs. 2 and 3 are particularly adapted for use with a self contained power source, such as the bottle 62 of liquid $CO_2$. The valve systems are designed to conserve the source of pressure and thus obtain the greatest number of power cycles for each bottle which also decreases the time consummated for a complete cycle of operation.

In Fig. 5 is shown a main control valve 65 mounted between supply connection 19 and a flexible hose 66 which may be connected to a stationary power source such as may be available in assembly line operation. Where the tool is to be carried around to various installations the main control valve 65 may be left mounted on the tool for use with a power line available at the place of installation.

I have thus devised a valve system for a fluid power operated tool or the like which provides for an automatic cut-off of the power source to the tool dependent on the predetermined pressure in the tool. By this arrangement I can obtain the maximum utilization of the available power source and a regulated period of the power cycle of the tool. By providing an adjustment to vary the pressure at which the cut-off mechanism will operate, the tool may be used on various sized work pieces with a minimum of power consumption. This is of primary importance when limited power source such as a self contained portable power source, namely bottled gas, is available. Where it is desired that the power cut-off be operated at a particular position of the actuated part of the tool, I provide a mechanical linkage connected to the piston so that when the piston reaches the end of the power stroke the power supply will be blocked. I can at the same time provide that the cylinder be vented at the completion of the power stroke to return the tool to its starting position independent of the action of the operator. This automatic timing of the power and return strokes eliminates lost time which results when the operator has to estimate the completion of a stroke. This feature insures a completed tool operation at maximum efficiency and economy. With my valve systems, I can utilize a bottled source of fluid pressure that can be attached to the tool and made portable therewith, which will provide a maximum number of power operated and repetitive cycles for a tool for each container of gas.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. A fluid operated tool comprising a cylinder, a piston slidably mounted in the cylinder for moving one part of the tool with respect to another, intake and exhaust ports leading to the cylinder, means to connect said intake port to a source of fluid pressure, a manually operable valve positioned between the cylinder and the source of power and intersecting the intake and exhaust ports movable alternately to open and block the respective ports, means to actuate the valve to admit fluid pressure to the cylinder, and means in the tool for automatically controlling the blocking of fluid to the tool at the end of the power stroke of the piston.

2. A fluid operated tool comprising a cylinder, a piston slidably mounted in the cylinder for moving one part of the tool with respect to another, intake and exhaust ports leading to the cylinder, means to connect said intake port to a source of fluid pressure, a valve positioned between the cylinder and the source of power and intersecting the intake and exhaust ports, said valve having means alternately to open and block the respective ports, means to actuate the valve to admit fluid pressure to the cylinder, a second valve positioned to intersect the intake port, said second valve operated by fluid pressure to block the intake port at the end of the power stroke of the tool.

3. A fluid operated tool comprising a cylinder, a piston slidably mounted in the cylinder for moving one part of the tool with respect to another, intake and exhaust ports leading to the cylinder, means to connect said intake port to a source of fluid pressure, a valve positioned between the cylinder and the source of power and intersecting the intake and exhaust ports, said valve having means alternately to open and block the respective ports means to actuate the valve to admit fluid pressure to the cylinder, a second valve positioned to intersect the intake port, said second valve operated by fluid pressure to block the intake port at the end of the power stroke of the tool, means to adjust the valve to operate at predetermined pressures.

4. A fluid operated tool comprising a cylinder, a piston slidably mounted in the cylinder for moving one part of the tool with respect to another, intake and exhaust ports leading to the cylinder, means to connect said intake port to a source of fluid pressure, a manually operable valve positioned between the cylinder and the source of power and intersecting the intake port, said valve movable alternately to open and block the inlet and exhaust ports, means to actuate the valve to admit fluid pressure to the cylinder, and means in the tool for automatically controlling the manually operable valve to block the fluid to the tool at the end of the power operation of the tool.

5. A valve system for controlling the admission of fluid pressure to a device comprising intake and exhaust ports, a control valve intersecting the ports and movable to alternately open and block the respective ports, means to connect said intake port to a source of power, a cut-off valve intersecting said intake port and having means to move said cut-off valve to open and block the intake port, said last named means comprising fluid pressure on one side of the cut-off valve and a resilient means on the opposite side opposing said pressure means.

HENRY PETER DUPRE.

References Cited in the file of this patent
UNITED STATES PATENTS

| Number | Name | Date |
|---|---|---|
| 944,485 | Hicks | Dec. 28, 1909 |
| 1,072,267 | Spohrer | Sept. 2, 1913 |
| 1,158,717 | Raber | Nov. 2, 1915 |
| 1,264,168 | Elvin et al. | Apr. 30, 1918 |
| 1,609,273 | Davis | Nov. 30, 1926 |
| 1,804,805 | Phillips | May 12, 1931 |
| 1,884,179 | Parks | Oct. 25, 1932 |
| 2,140,059 | Simonsen | Dec. 13, 1938 |
| 2,222,141 | Denison | Nov. 19, 1940 |
| 2,246,379 | Muir et al. | June 17, 1941 |
| 2,362,864 | Towler | Nov. 14, 1944 |
| 2,415,326 | Wright | Feb. 4, 1947 |
| 2,433,719 | Van Sittert | Dec. 30, 1947 |